Patented Apr. 1, 1947

2,418,416

UNITED STATES PATENT OFFICE 2,418,416

MANUFACTURE OF AZO LAKES

Roy C. Locke, Salem, N. J., assignor to E. I. du Pont de Nemours & Company, Wilmington, Del., a corporation of Delaware No Drawing. Application December 30, 1943, Serial No. 516,161

6 Claims. (Cl. 260—195)

This invention relates to improvements in the manufacture of colored azo compounds which are suitable for use as lake pigments.

Heretofore azo compounds, subsequently to be laked, have been made by first forming in acid medium the diazo of an amino base, such as aniline or amino-benzoic acid, then coupling in alkaline medium by adding the acid diazo to the alkaline solution of a coupling component, such as beta naphthol or 2-hydroxy-3-naphthoic acid. In these azo combinations, one of the components always contains a solubilizing group which combines with the alkaline earth metal when the lake is formed. In this procedure, the particles of diazotized amino base are well dispersed in the acid diazo medium when the diazo is first formed, but they rapidly grow into particles or aggregates of large dimensions and of different and varying characteristics. When disposed in alkaline medium for coupling, there is a consequent variable rate of breaking up or solution of the diazo particles which results in a retardation of the coupling and variations in the characteristics of the coupled products. More especially, the variations in the coupling products become manifest and of more critical importance when the coupling products are reacted with salts of laking metals, such as the salts of the alkaline earth metals. In order to overcome the effects due to the variable growth or agglomeration of the diazo particles, it has been proposed to diazotize the amino base in the acid diazotizing medium in the presence of a suspension of the coupling component, and then effect coupling by making the medium alkaline. The purpose of this procedure is to spread the freshly formed diazo compound over the surfaces of the solid coupling component before time for harmful growth of the diazo particles has elapsed. In this procedure the rate of coupling is improved somewhat but the particle size and rate of solution of the coupling component in the alkaline coupling medium is not controllable within the limits which will avoid undesirable variations in the laked products.

It is among the objects of the present invention to provide improved methods for producing azo lakes. Another object of the invention is to provide new methods of coupling which are capable of producing products of uniform physical properties throughout the making of a series of different batches. Other objects of the invention will be apparent from the following description.

The objects of the invention are attained in general by providing a solution of the coupling component in an aqueous non-oxidizing mineral acid, said solution having sufficient acid therein to prevent coupling after an amino base which is added thereto is diazotized. The amino base is added to this acid solution and diazotized in the presence of the coupling component. The acidity of the resulting mixed solution of coupling component and diazo is then uniformly reduced to produce a coupling medium of desired pH value wherein the coupling is permitted to proceed to completion.

The invention will be more fully set forth in the following more detailed description which includes examples that are given as illustrative embodiments of the invention and not as limitations thereof. Parts are expressed in parts by weight unless otherwise noted.

Example 1

A slurry was made by adding 180.5 parts of 2-naphthol-3,6-disulfonic acid and 68.5 parts of ortho-amino-benzoic acid to 1500 parts of water. The slurry was brought to 32° F. and the solids were dissolved by adding 120 parts of hydrochloric acid (37.5%) with stirring at a pH of 0.2. The amino base was diazotized by adding a solution consisting of 35.5 parts of sodium nitrite in 100 parts of water. When diazotization to a distinct end point was indicated by testing with potassium iodide starch paper, the pH value had increased to 0.6, whereupon the acidity of the solution was reduced further by rapidly adding with stirring a solution consisting of 72 parts of caustic soda in 900 parts of water to produce a coupling medium having a pH value of 7.8. The mixture was then stirred for 30 minutes when the usual tests indicated that coupling was complete. The coupling product which separated from the coupling medium was filtered off and washed. The product was an orange paste dissolving to a yellowish red solution in water.

The coupling product was laked by preferably suspending the dye in water at a concentration substantially higher than 3.5% solids at a temperature of 75° F., adding sufficient inorganic lake extender, preferably consisting of 80% aluminum hydrate and 20% zinc oxide, slurried in water at a 10% solids concentration and being present in the ratio of 3:1 on the basis of the combined weight of the extender and dye; adding barium chloride ($BaCl_2.2H_2O$) at a 10% concentration in water in a sufficient quantity to equal twice the weight of the dye to effect the precipitation at 75° F. and further developing by heating the lake to 140° F. The precipitate is then washed, filtered and dried. The resulting bluish red product has good resistance to light, heat and water bleeding as a lithographic ink.

The laking may be effected also by the analogous procedure given above without isolating, washing and reslurrying the coupling product. In this case, however, it is better to decrease the pH of the coupling medium within a range from 7.0 to 7.2 prior to laking for reasons obvious to those skilled in the art.

When comparisons are made as a lithographic ink the resulting lake has a greater intensity of masstone, slightly yellower and slightly duller shade and a stronger tinctorial value than the lake developed from the isolated sodium salt.

The extender may be omitted provided a particle cementation is not encountered in drying which creates deleterious effects.

The pigment thus produced is of uniform satisfactory quality and its properties do not vary among different batches. Pigments which are made from the same intermediates by the coupling processes employed in the prior art vary greatly in properties among different batches.

*Example 2*

A slurry was made by adding 180.5 parts of 2-naphthol-3,6-disulfonic acid and 68.5 parts of ortho-amino-benzoic acid to 1500 parts of water. The slurry was brought to 32° F. and the solids were dissolved by adding 60 parts of hydrochloric acid (37.5%) with stirring. The amino base was diazotized by adding a solution consisting of 35.5 parts of sodium nitrite in 100 parts of water. When diazotization to a distinct end point was indicated by testing with potassium iodide starch paper, the acidity of the solution was reduced by rapidly adding with stirring a solution consisting of 29.0 parts of caustic soda in 300 parts of water to produce a coupling medium. The mixture was then stirred for 30 minutes when the usual tests indicated that coupling was complete. The coupling product which separated from the coupling medium was filtered off, washed and dried. The product was a bluish red powder dissolving to a yellowish red solution in water.

The coupling product was laked with barium chloride, producing a bluish red product having good fastness to light, heat and water bleeding.

The pigment thus produced is of uniform satisfactory quality and its properties do not vary among different batches. Pigments which are made from the same intermediates by the coupling processes employed in the prior art vary greatly in properties among different batches.

*Example 3*

By a procedure like that of Example 1, except that 151.5 parts of beta-naphthylamine-1,6-disulfonic acid were used instead of ortho-aminobenzoic acid, a barium laked pigment of 1,6-disulfo-2-naphthalene-azo-beta - naphthol - 3,6-disulfonic acid was made. The laked product was a bluish red fast to light product having good fastness to alkali.

The properties of this product made in different batches were uniform whereas lack of uniform properties was the rule when the laked product was similarly produced, except that the coupling was performed by prior art processes.

*Example 4*

When the coupling was made like the coupling of Example 1 except that 45.5 parts of aniline were used instead of ortho-amino-benzoic acid and 134.4 parts of 2-hydroxynaphthalene-6-sulfonic acid were used instead of 2-naphthol-3,6-disulfonic acid, the monazo compound in the form of its sodium salt was insoluble and suitable for use as a pigment. When the product was converted to an alkaline earth metal lake, the lake was yellowish red and had moderate fastness to light, spirit, water and oil. These properties were uniform among different batches, but when laked products were made in the same way except that the coupling was made in accordance with the processes of the prior art, the products were not uniform in these properties among different batches.

*Example 5*

By using 142 parts of 1-para-sulfophenyl-3-methyl-5-pyrazolone as the coupling component and 43.5 parts of aniline as the amino base in the process of Example 1, the reddish yellow, readily soluble sodium salt of 4-benzene-azo-1-para-sulfobenzene-3-methyl - 5 - hydroxy-pyrazol was made. The lakes made with different batches of this compound had like and uniform fastness to light and spirit.

*Example 6*

By using 193 parts of 1-(2,3-dichloro-4-sulfophenyl)-3-methyl-5-pyrazolone as the coupling component and 86.5 parts of sulfanilic acid as the amino base in the process of Example 1, bright yellow, readily soluble sodium salt of 4-para-sulfo-benzene-azo-1-(2,3-dichloro-4 - sulfophenyl)-3-methyl-5-hydroxy-pyrazol was made.

*Example 7*

By using 134.4 parts of 2-naphthol-5-sulfonic acid as the coupling component and 71.5 parts of alpha naphthylamine as the amino base in the process of Example 1 instead of the coupling component and amino base there used, the practically insoluble bright maroon sodium salt of naphthalene-azo-2-naphthol-5-sulfonic acid was made. The powder thus produced is suitable for use as a pigment where exceptional fastness is not necessary. The sodium salt thus produced was converted to an alkaline earth metal lake by the process used in Example 1. The resulting pigment had appreciably better general fastness properties. Different batches of these products had uniform properties, whereas the properties of this azo combination varied considerably when it was produced by the methods of the prior art wherein the coupling was brought about by a more or less gradual mixing of the alkaline solution of the coupling component and the acid suspension of the diazo.

*Example 8*

By using 60.5 parts of meta-xylidine instead of the anthranilic acid in the process of Example 1, meta-xylidine-azo - 2 - hydroxynaphthalene - 3,6-disulfonic acid was made.

The water-soluble bluish red powder may be precipitated by barium chloride or lead acetate to form a scarlet pigment of moderate fastness to light, alkali and bleeding in water, spirit and oil. The uniformity of succesive batches greatly excels that obtainable by the prior art method of coupling wherein an acid solution of the diazo of the primary amino compound is mixed with an aqueous alkaline solution of the coupling component to produce the coupling medium.

Any azo dye intermediate can be used in the process of the invention which employs any primary mono-, or poly-amino aryl body as a diazo component and an aryl coupling component containing a hydroxyl and a solubilizing grouping, such as sulfo or carboxy on the aryl nucleus and is devoid of primary amino groups. It is essential that one component contains a water solubilizing group, and that the coupling component and the diazo of the amino base are soluble in an aqueous non-oxidizing mineral acid solution of suitable acid concentration to effect diazotization of the amino base. Any non-oxidizing mineral acid such as hydrochloric or sulfuric acid can be used. Any amino base of the benzene, diphenyl or naphthalene series and any azo dye coupling component of the benzene and naphthalene series can be used, provided the diazo and the coupling component are soluble in an acid solution which is suitable for diazotization of the amino base at diazotization temperatures.

As illustrative of the many other amino bases which can be used in the novel manners are mentioned p-aminoacetanilide, p-aminobenzaldehyde, m-amino-p-cresol, p-amino-phenol, amino-salicylic acid, aniline, o-anisidine, m-chlor-o-anisidine, o-chlor-p-nitraniline, cresidine, p-dichloraniline, m-dichloraniline, m-nitro-o-aminophenol, p-nitro-o-aminophenol, p-nitraniline, m-nitraniline, m-nitro-o-anisidine, p-nitro-o-anisidine, o-nitro-m-chloraniline, o-nitro-p-chloraniline, o-nitro-p-phenetidine, nitro-m-phenylenediamine, o-nitro-p-toluidine, m-nitro-p-toluidine, p-nitro-o-toluidine, p-phenetidine, m-phenylene-diamine, p-phenylenediamine, picramic acid, o-toluidine, m-toluidine, p-toluidine, p-xylidine, amino azo benzene, amino azo toluene, p-amino diphenylamine, benzidine, dichlorobenzidine, ethoxybenzidine, tolidine, alpha naphthylamine, beta napthylamine, p-aminophenol disulfonic acid, p-aminophenol sulfonic acid, aminosalicylic acid, sulfonic acid, o-amino-p-sulfobenzoic acid, aniline disulfonic acid, chloro-m-phenylene-diamine sulfonic acid, o-chloro-m-toluidine-p-sulfonic acid, dehydrothio-p-toluidine sulfonic acid, 2,6-diaminophenol-4-sulfonic acid, m-dinitraniline sulfonic acid, metanilic acid, 1,3-phenylenediamine-4,6-disulfonic acid, m-phenylenediamine sulfonic acid, sulfanilic acid, p-toluidine-o-sulfonic acid, m-toluylenediamine sulfonic acid, m-xylidine-o-sulfonic acid, xylidine sulfonic acid, amino azo benzene sulfonic acid, benzidine sulfonic acid, tolidine sulfonic acid, o-tolidine disulfonic acid, 1-naphthylamine-3,8-disulfonic acid, 2-naphthylamine-3,7-disulfonic acid, 1-naphthylamine-4,8-disulfonic acid, 1-naphthylamine-3,6-disulfonic acid, 2-naphthylamine-4,7-disulfonic acid, 2-naphthylamine-5,7-disulfonic acid, 2-naphthylamine-6,8-disulfonic acid, 1-amino-5-naphthol-7-sulfonic acid, 2-amino-3-naphthol-6-sulfonic acid, 1-amino-7-naphthol-3-sulfonic acid, 2-amino-5-naphthol-7-sulfonic acid, 1-amino-8-naphthol-3-sulfonic acid, 2-amino-7-naphthol-3-sulfonic acid, 1-amino-8-naphthol-4-sulfonic acid, 2-amino-8-naphthol-6-sulfonic acid, 1-amino-2-naphthol-4-sulfonic acid, 1-amino-8-naphthol-2,4-disulfonic acid, 1-amino-8-naphthol-4,6-disulfonic acid, 1-amino-8-naphthol-3 5-disulfonic acid, 2-amino-8-naphthol-3,6-disulfonic acid, 1-amino-8-naphthol-3,6-disulfonic acid, 1,2-diamino-3-naphthol-6-sulfonic acid and 1,2-diamino-5-naphthol-7-sulfonic acid. An illustrative of the many other azo dye coupling components which can be used in the new process are mentioned o-cresotinic acid, 3,5-dihydroxybenzoic acid, 4-dimethylamino-4'-hydroxy-diphenylamine sulfonic acid, phenol-o-sulfonic acid, pyrogallol-5-sulfonic acid, resorcinol sulfonic acid, beta-resorcylic acid, salicylic acid, 1-naphthol-4-sulfonic acid, 2-naphthol-1-sulfonic acid, 1-naphthol-5-sulfonic acid, 1-naphthol-8-sulfonic acid, 2-naphthol-7-sulfonic acid, 2-naphthol-8-sulfonic acid, 1-naphthol-3,8-disulfonic acid, 1-naphthol-4,8-disulfonic acid, 2-naphthol-6,8-disulfonic acid, 1-naphthol-3,6-disulfonic acid, 2-naphthol-4,8-disulfonic acid, 2-naphthol-3,7-disulfonic acid, 1,5-dihydroxy naphthalene-2-sulfonic acid, 1,3-dihydroxy naphthalene-6-sulfonic acid, 1,7-dihydroxy naphthalene-3-sulfonic acid, 2,7-dihydroxy naphthalene-3-sulfonic acid, 1,8-dihydroxy naphthalene-3-sulfonic acid, 1,8-dihydroxy naphthalene-4-sulfonic acid, 1,7-dihydroxy naphthalene-4-sulfonic acid, 1,3-dihydroxy naphthalene-4-sulfonic acid, 1,3-dihydroxy naphthalene-5,7-disulfonic acid, 1,8-dihydroxy naphthalene-3,6-disulfonic acid, 1,5-dihydroxy naphthalene-3,7-disulfonic acid, 1,8-dihydroxy naphthalene-2,4-disulfonic acid, 1,7-dihydroxy naphthalene-3,6-disulfonic acid, 2,3-dihydroxy naphthalene-6,8-disulfonic acid, 1,8-dihydroxy naphthalene-3,5-disulfonic acid, 8-chloro-alpha-naphthol-3,6-disulfonic acid, 8-chloro-alpha-naphthol-5-sulfonic acid, 1,7-dihydroxy-2-naphthoic-4-sulfonic acid, dimethylamino-naphthol sulfonic acid, ethylamino-naphthol sulfonic acid, methylamino-naphthol sulfonic acid, 1-naphthol-3,6,8-trisulfonic acid, 2-naphthol-3,6,8-trisulfonic acid and phenylamino-naphthol sulfonic acid.

In forming the products of coupling, any primary mono- or poly-amino aryl diazo component may be used. It is essential that all primary amino groups thereof be diazotized and that the coupling component be devoid of primary amino groups. More than one solubilizing group may be present in the coupling product and they may be substituted on the aryl nuclei of both the diazo and coupling component. It is essential that the coupling component and the amino base be soluble in an aqueous solution of a non-oxidizing mineral acid of suitable concentration in which to effect diazotiaztion of the amino base by the action of a diazotizing agent. Any non-oxidizing mineral acid, such as hydrochloric acid or sulfuric acid can be used. Within the described limitations any amino base of the benzene, diphenyl or naphthalene series and any azo dye coupling component can be used, provided they are soluble in the acid solution which is suitable for diazotization of the amino base at diazotization temperatures. As a general rule, the mixed acid solution of diazo compound and coupling component should have a pH value less than 4.0 and the pH value of the coupling medium should have a pH value higher than about 4.0. For the best results the acid solution of mixed intermediates should have a pH value of about 0.2 and the coupling medium should have a pH value of about 7.8, but considerable variation from the optimum pH values is permissible.

By the processes of this invention, azo products having consistently uniform properties are made in different batches and the variables of the prior art methods which produce lack of uniformity in the products are eliminated. A considerable advantage also results from the fact that diazotization and coupling may be carried out in the same vessel, thereby simplifying and reducing the necessary process equipment.

This is a continuation-in-part of my copending application Serial No. 468,546.

I claim:

1. A process of manufacturing laked azo compounds which comprises dissolving an amino base of the benzene, biphenyl and naphthalene series and an azo dye coupling component of the benzene and naphthalene series in an aqueous non-oxidizing mineral acid solution having a sufficiently low pH value to effect the diazotization of the amino base when a diazotizing agent is added without effecting subsequent coupling in the resulting solution, said coupling component containing an hydroxyl group and a solubilizing group and being devoid of primary amino groups, adding a diazotizing agent to effect diazotization of the amino base, then increasing the pH value of the resulting solution until coupling takes place and an alkali metal salt of the resulting coupling product is formed, and finally laking the alkali metal salt of the azo compound by the action of a salt of a laking metal.

2. A process in accordance with claim 1 in which the pH of the aqueous non-oxidizing mineral acid solution is substantially lower, and the pH of the coupling medium is substantially higher than about 4.0.

3. A process in accordance with claim 1 in which the pH of the aqueous non-oxidizing mineral acid solution is about 0.2 and the pH of the coupling medium is about 7.8.

4. A laked azo compound produced by a process which comprises making a solution of anthranilic acid and 2-naphthol-3,6-disulfonic acid in aqueous hydrochloric acid in which mineral acid is present in sufficient amount to provide a solution having a pH value of about 0.2, adding sodium nitrite until the anthranilic acid is diazotized, adding an alkali of an alkali metal until a coupling medium having a pH value of about 7.8 is produced, allowing the alkali salt of the product formed by coupling anthranilic acid and 2-naphthol-3,6-disulfonic acid to form, and then forming the barium salt of said coupling product by the action of a water soluble non-oxidizing mineral salt of barium.

5. The product in accordance with claim 4 in which the coupling component consists of 2-naphthol-3,6-disulfonic acid and the amino base is beta-naphthylamine-3,6-disulfonic acid.

6. The product in accordance with claim 4 in which the coupling component consists of 2-hydroxynaphthalene-6-sulfonic acid and the amino base is aniline.

ROY C. LOCKE.

REFERENCES CITED

The following references are of record in the file of this patent:

UNITED STATES PATENTS

| Number | Name | Date |
| --- | --- | --- |
| 1,922,463 | Turski | Aug. 15, 1933 |
| 2,248,091 | Kirst et al. | July 8, 1941 |
| 2,112,864 | Pool et al. | April 5, 1938 |
| 2,208,932 | Kranzlein et al. | July 23, 1940 |
| 2,144,578 | Pool et al. | Jan. 17, 1939 |
| 1,820,540 | Martone | Aug. 25, 1931 |

FOREIGN PATENTS

| Number | Country | Date |
| --- | --- | --- |
| 19,075 | British | Aug. 12, 1899 |
| 394,317 | British | June 9, 1933 |
| 21,089 | Australian | Jan. 26, 1935 |